United States Patent [19]

Inoue et al.

[11] Patent Number: 5,443,772
[45] Date of Patent: Aug. 22, 1995

[54] METHOD OF RECLAIMING PLASTIC PRODUCT WITH PAINT FILM

[75] Inventors: Shigeki Inoue; Fumiaki Tsuda; Mitsuo Nagai; Tadamoto Sakai; Kazuyuki Nakamura, all of Hiroshima, Japan

[73] Assignee: The Japan Steel Works, Ltd., Tokyo, Japan

[21] Appl. No.: 87,321

[22] Filed: Jul. 8, 1993

[30] Foreign Application Priority Data

Jul. 9, 1992 [JP] Japan ................. 4-204334

[51] Int. Cl.⁶ ............ B29B 17/02; B29C 47/76; B29K 105/26
[52] U.S. Cl. .................. 264/102; 241/17; 241/23; 264/211.21; 264/349; 264/DIG. 69; 425/DIG. 46; 425/203
[58] Field of Search ............. 264/101, 102, 37, 349, 264/DIG. 69, 211.21; 425/DIG. 46, 203; 106/122; 241/15, 17, 19, 23, DIG. 38

[56] References Cited

U.S. PATENT DOCUMENTS

| | | | |
|---|---|---|---|
| 4,051,212 | 9/1977 | Grigat et al. | 264/102 |
| 4,098,649 | 7/1978 | Redker | 264/349 |
| 4,496,707 | 1/1985 | Liggett | 106/122 |
| 5,215,625 | 6/1993 | Burton | 264/37 |

FOREIGN PATENT DOCUMENTS

| | | |
|---|---|---|
| 0011662 | 11/1978 | European Pat. Off. . |
| 0547249 | 3/1992 | European Pat. Off. . |
| 51-16380 | 2/1976 | Japan ............ 264/DIG. 69 |
| 55-140528 | 11/1980 | Japan ............ 264/37 |
| 1510261 | 1/1976 | United Kingdom . |
| 9301232 | 1/1993 | WIPO . |

OTHER PUBLICATIONS

B. Rapp, "Wiederverwertung von lackierten PP-EPDM-Stosfängern," Plastverarbeiter, vol. 42, No. 7, Jul. 1991, Speyer/Rhein, DE, pp. 48–52.
H. Brückner et al., "PUR-RRM ist recyclingfähig," Kunststoffe, vol. 81, No. 9, Sep. 1991, München, DE, pp. 751–759.
G. Menges et al., "Verschmutzte Kunststoffabfälle werden zu wachsartigen Substanzen," Kunststoffe, vol. 82, No. 2, Feb. 1992, Müchen, DE, pp. 106–109.

Primary Examiner—Mathieu D. Vargot
Attorney, Agent, or Firm—Sughrue, Mion, Zinn, Macpeak & Seas

[57] ABSTRACT

A method of reclaiming a plastic product having a paint film, including the steps of: obtaining crushed particles by crushing a plastic product having a paint film into particles of a predetermined size; supplying the crushed particles to a screw-type extruder; kneading and fusing the crushed particles while supplying water thereto; and obtaining a plastic by discharging a gas produced by decomposing the paint film and vaporized water.

6 Claims, 3 Drawing Sheets

METHOD OF RECLAIMING PLASTIC PRODUCT WITH PAINT FILM

BACKGROUND OF THE INVENTION

1. Field of the invention

The invention pertains to a method of reclaiming a plastic product, such as a bumper of an automobile, having a paint film coated on the surface thereof. More particularly, the invention is directed to a method of reclaiming a plastic product by producing a plastic body while separating a cured paint film from the surface of the plastic body.

2. Prior art

Plastic products generally have excellent corrosion resistance. Because of good corrosion resistance the plastic products are difficult to bring back to nature when scrapped and therefore liable to cause environmental problems if left untreated. Since resources are finite, they must be utilized effectively. Hence, it is desired that plastic waste be collected and reclaimed.

If a plastic product is made of a single material, the plastic product is comparatively easy to re-use because such product can be collected and fused to be pelletized. However, if a plastic product is made up of a plastic body and other kinds of resins, the re-use of the product is generally limited because collection and separation of the other kinds of resins from the plastic body is difficult. Cabinets of electrical appliances, e.g., are formed of a plastic and are coated in a variety of colors from design considerations. It is difficult to collect only a plastic body from a plastic product having such a paint film.

To overcome this problem, plastic products having a paint film are often crushed without separating the cured paint film therefrom and formed into reclaimed products by an extruder, press-forming equipment or the like.

A reclaiming method involving separation and removal of the paint film has recently been studied, and a method of separating a paint film by means of an organic solvent is proposed. The proposed method includes the steps of: crushing a plastic product having a paint film; separating the paint film by dipping the crushed pieces into a solvent consisting essentially of an organic salt or the like; separating the plastic body from the crushed pieces; rinsing the plastic body with water and drying the rinsed plastic body; and pelletizing the thus processed plastic body with an extruder or the like. Another method is also proposed. This method is characterized as causing the crushed pieces to come in contact with a solvent consisting essentially of an organic salt or the like under high temperature and pressure to chemically decompose the paint film.

The method of forming a reclaimed product with an extruder or the like by directly crushing a plastic product having a paint film without separating the paint film from the plastic body is economically advantageous in that what is required is only crush the collected plastic product.

However, the paint film or the paint is mixed in the crushed pieces, and this makes the formed reclaimed product inferior in quality and limited in application.

To overcome this problem, the paint film is separated and removed from the fused plastic by inserting a plurality of screens of high meshes in combination into an end of the extruder. Such separating and removing method is advantageous in terms of efficiency. However, the availability of screens of desired meshes is limited. As a result, film pieces finer than the available meshes still remain, thus making the appearance of the formed product poor. In addition, the mixture of foreign matter such as the paint film pieces makes the formed reclaimed product insufficient in strength, which has been verified by the inventors. Therefore, applications for the reclaimed plastic recovered by means of the above-described methods are limited to, e.g., making benches in parks, fence, and blocks for pavements.

To overcome the low quality and limited use, attempts have been made not only to pulverize the paint film to sizes smaller than 10 $\mu$m, but also to reduce the ratio of mixing the paint film in the reclaimed plastic. The results are, however, not satisfactory. Even with a plastic product such as a bumper of an automobile whose film mixing ratio is about 2% by weight which is relatively low, an addition of 80 to 90% of new plastic per bumper is required to reduce the film mixing ratio; otherwise, the formed reclaimed product does not meet quality requirements, nor is such product practically applicable. Even if a kneading disc or a reversible screw is used to improve kneading and screens are used for filtration in order to make the paint film pieces still finer and low mixing ratio, it is extremely difficult to pulverize the paint film pieces to sizes smaller than 10 $\mu$m. As a result, some practical problems are imposed to be solved.

The method of separating the paint film with an organic solvent allows the plastic body to be separated, but is cumbersome because the paint film must be scraped off after swollen by a solvent such as an organic salt. In addition, this method demands not only a large cost in treating the waste solvent in order to prevent environmental pollution, but also a large amount of water for rinsing plastic, and is likely to involve large equipment. The paint film is separated from the plastic body in the solvent easily. However, since the specific gravities of the paint film and the plastic body are larger than that of the solvent, the paint film and the plastic body get settled down together. As a result, it is extremely difficult to separate only the plastic body from the solvent containing both the paint film and the plastic body to an appropriate degree of accuracy. Thus, mixture of the paint film pieces in the plastic body is unavoidable, making the reclaimed product poor in quality even if the reclaimed method uses the organic solvent.

The method of chemically decomposing the paint film by increasing the temperature and pressure of an autoclave allows the plastic body alone to be separated with efficient decomposition of the paint film. However, the method also involves large equipment, demands a large cost in treating the waste solution, and is time-consuming to completely decompose the paint film. In addition, the batch operation makes the process less productive. The separated plastic body must be washed to remove the adhering solvent and pelletized by an extruder thereafter, thus making the process complicated and inefficient.

SUMMARY OF THE INVENTION

The invention has been made to overcome the above problems. Accordingly, the object of the invention is to provide a method of reclaiming a plastic product having a paint film, which is capable of reclaiming the plastic from the plastic product having the paint film in high quality as well as inexpensively.

To achieve the above object, the invention is applied to a method of reclaiming a plastic product having a paint film which comprises the steps of: obtaining crushed particles H by crushing a plastic product having a paint film into particles of a predetermined size; supplying the crushed particles to a screw-type extruder; kneading and fusing the crushed particles H while supplying water thereto; and obtaining a plastic by discharging a gas produced by decomposing the paint film and vaporized water.

Further, in the method the operations of kneading the crushed particles while supplying water thereto and discharging the gas produced by decomposing the paint film and the vaporized water are repeated twice or more inside the screw-type extruder.

Still further, the method comprises the steps of: separating the paint film from the plastic body while supplying water to the plastic product having the paint film being kneaded and fused by the screw-type extruder, decomposing the separated paint film while supplying water to the plastic product having the paint film being kneaded and fused by the screw-type extruder, and gasifying the decomposed paint film while supplying water to the plastic product having the paint film being kneaded and fused by the screw-type extruder.

Still further, in the method of the present invention, the gas produced by decomposing the paint film and the vaporized water in the screw-type extruder by forced suction are discharged.

Still further, in the method, the water supplied to the screw-type extruder is an alkali aqueous solution.

Still further, the method comprises the steps of: immersing the crushed particles H into or bringing the crushed particles into contact with an ethanol solution; and supplying the thus treated crushed particles H to the screw-type extruder thereafter.

Still further, in the method, the crushed particles are obtained by crushing a bumper of an automobile, the bumper being made of a thermoplastic resin and having a paint film.

DETAILED DESCRIPTION OF THE PREFERRED EMBODIMENTS

Figure 1:
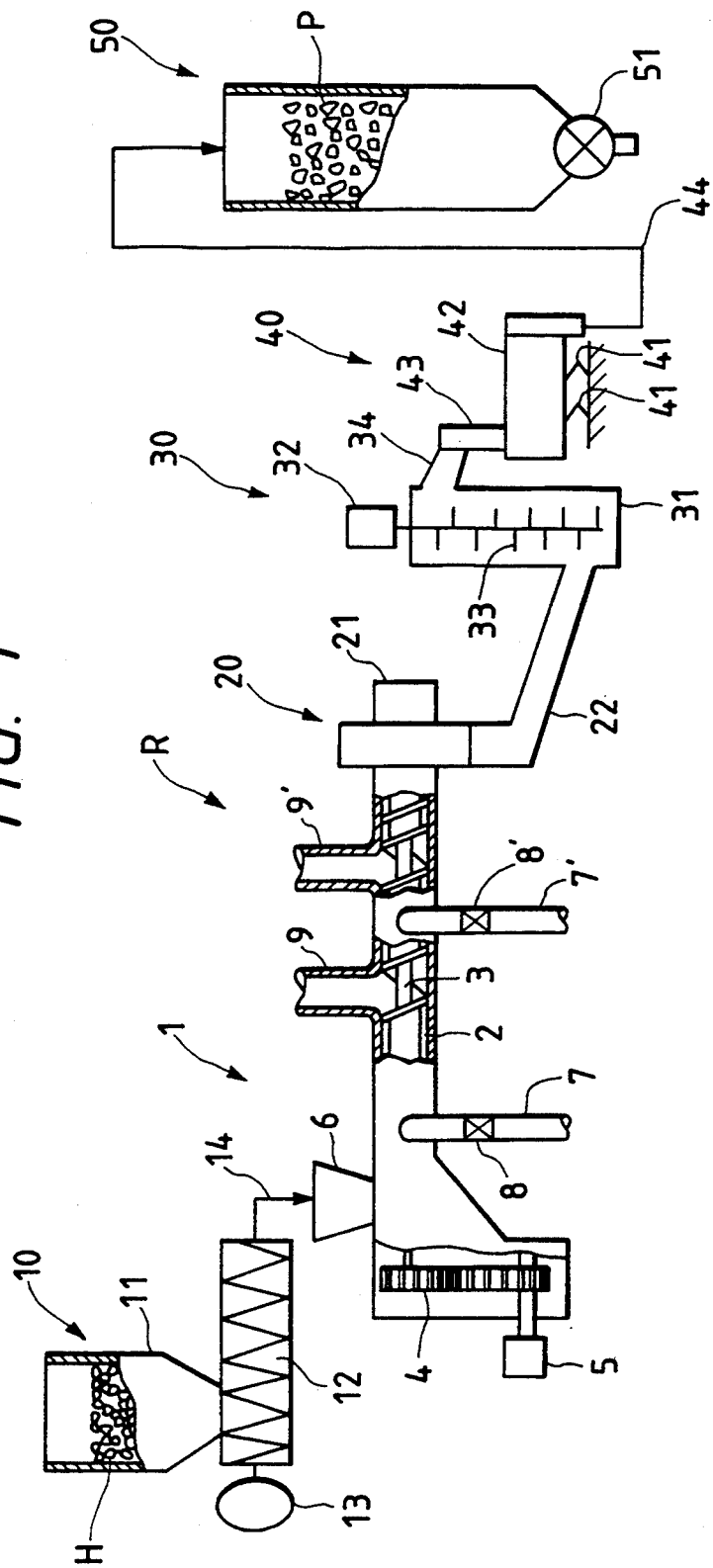
FIG. 1 is a partially sectional front view showing a reclaiming apparatus that is used in an embodiment of the invention.

The invention involves the use of a crusher, an extruder, and the like. The crusher is not shown in the drawings because a conventional one can be used. Since reclaimed plastic is preferred to be pelletized, the extruder used in the embodiment is provided with a cutter, a drier, and the like.

An exemplary extruder and its accessories used in the embodiments of the invention will be described with reference to FIG. 1. A reclaiming apparatus R of the invention includes: an extruder 1, a weighing supply unit 10 for supplying crushed plastic particles to the extruder by a predetermined amount; a cutting unit 20, a drying unit 30, a vibration screen 40, a storage tank 50, and the like which are additionally provided on the downstream side of the extruder 1.

The extruder 1 has: a known cylinder 2 with a heater arranged on the outer surface thereof; and a screw 3 that is driven to rotate inside the cylinder 2. In a casing arranged on the upstream end of the cylinder 2 is a reducing mechanism 4. The screw 3 is driven at a predetermined speed by, e.g., an electric motor 5 through the reducing mechanism 4.

On the upstream side of the cylinder 2 is a hopper 6 for pouring the crushed particles into the cylinder 2, whereas on the downstream side and between a plurality of vent holes (described later) are a plurality of supply tubes 7, 7' for supplying a liquid such as water, an alkali aqueous solution, or the like. The supply tubes 7, 7' are provided with check valves 8, 8', so that the liquid is only fed into the cylinder 2 by pressure.

On the downstream side, the cylinder 2 are a plurality of vent holes, which have vent tubes 9, 9. These vent tubes 9, 9 are connected to a vacuum source as appropriate.

The weighing supply unit 10 includes a hopper 11 and a screw conveyor 12. When the screw conveyor 12 is driven by a motor 13, the crushed particles H contained in the hopper 11 are charged into the cylinder 2 via a charging tube 14 in such a manner that the amount of the crushed particles H is controlled in accordance with the rotational speed of the motor 13.

The cutting unit 20, which is not shown in detail in FIG. 1 is designed to pelletize the plastic extruded from the extruder 1 by cutting into pieces of a predetermined size while cooling the plastic with cooling water. The cutting unit 20 has a cutting blade that is rotated by a motor 21. Pellets prepared by the cutting unit 20 are transferred to the lower side of the drying unit 30 by a chute or air chute 22 together with the cooling water.

The drying unit 30 is a centrifugal dehydrating drier having a longitudinally cylindrical casing 31. Inside the casing 31 are a porous cylinder for dehydration and rotary vanes 33 driven by a motor 32. The pellets are dried and transferred upward by the rotary vanes 33 while being pushed onto the porous cylinder by centrifugal force.

The vibration screen 40 has a container body 42 supported by springs 41, 41. A screen having a predetermined mesh is replaceably arranged inside the body 42. Outside the body 42 is a vibrator. A chute 34 is connected to an end of the container body 42 through a damping material 43. One end of the chute 34 is attached to the upper portion of the casing 31 of the drying unit 30. The other end of the container body 42 is connected to a transfer tube 44 of, e.g, an air conveyor similarly through a damping material.

When the container body 42 is vibrated by the vibrator, the pellets are screened by the screen and move over the screen from one side to the other.

The storage tank 50 has a known structure. On top of the tank is the transfer tube 44 of the air conveyor, whereas at the bottom of the tank is a gate or rotary discharging unit 51.

An operation of the reclaiming apparatus R of the invention will be described in terms of how a plastic body made of polypropylene having a urethane coating, such as a bumper of an automobile, is reclaimed.

A plastic product is crushed in advance. The crushed particles H contain the plastic body made of polypropylene and the urethane film coated on the surface of the plastic body. The crushed particles H are stored in the hopper 11 of the weighing supply unit 10. Then, the screw conveyor 12 is driven at a predetermined speed by the motor 13. As a result, the crushed particles H are supplied to the hopper 6 of the extruder 1 from the charging tube 14 in such a manner that the amount of the crushed particles H is controlled in accordance with the screw conveyor 12 drive speed.

Then, the electric motor 5 is activated to drive the screw 3 of the extruder 1. The heater provided on the outer surface of the cylinder 2 is turned on. The alkali aqueous solution is supplied from the supply tube 7 and the vent tubes 9, 9' are evacuated to a negative pressure.

The crushed particles H supplied to the extruder 1 are transferred downstream by the screw 3. During this process, the crushed particles H are fused and kneaded by heat from the heater and by kneading due to shearing, friction, etc. caused by the rotation of the screw 3. The crushed particles H are kneaded also with the alkali aqueous solution. The crushed particles get fused under such high temperature and pressure.

On the other hand, the film gets not only separated from the plastic body as the shearing force, the frictional force, etc. are increased by the rotation of the screw 3 with the plastic being highly viscous in the fusing process, but also pulverized mechanically. As a result, the film is decomposed by the alkali aqueous solution from the outer periphery thereof and then gasified. Further, when the alkali aqueous solution is vaporized in the plastic, the heat of the plastic is released as latent heat of vaporization. This decreases the temperature of the plastic and in turn increases the viscosity of the fused plastic body, thereby increasing the shearing force, the frictional force, etc. and encouraging the pulverization of the film that has not yet decomposed. As a result, the film becomes so fine as to be dispersed in the fused plastic. As the film is pulverized into fine pieces, the total surface area thereof increases. This increases the contact efficiency between the film pieces and the alkali aqueous solution, thereby improving the decomposition effect. The decomposed gas and the gasified alkali aqueous solution are exhausted from the vent tube 9. Similarly, the alkali aqueous solution is supplied from the supply tube 7'. The film pieces are again gasified by mechanical pulverization and decomposition by the alkali aqueous solution, and the decomposed gas is driven out of the vent tube 9'. The same process is repeated.

The film pieces are made finer by mechanical pulverization and finally gasified by decomposition from the outer peripheries thereof. Part of the film pieces left undecomposed are dispersed in the plastic by being made into still finer pieces while kneaded by the screw 3 and the plastic in which the finer film pieces are dispersed is extruded by dies of the extruder 1.

When extruded from the extruder 1, the plastic in which the finer film pieces are dispersed is cut into pellets by the cutting unit 20 so that pellets P are obtained. The thus formed pellets are transferred to the lower part of the drying unit 30 by the chute 22. Since the rotary vanes 33 are being driven by the motor 32 of the drying unit 30, the pellets P are transferred upward inside the casing 31. During this process, the pellets P are subjected to centrifugal dehydrating and is supplied to the vibrating screen 40 by the chute 34 thereafter. The pellets P are subjected to sizing during their transfer over the screen from one place to another with too large or small pellets being rejected. Those pellets not rejected become reclaimed product. The reclaimed product pellets are transferred to the storage tank 50 by the air conveyor 43 for storage.

Examples of the present invention will now be described.

EXAMPLE 1

A bumper of an automobile, which is made of a polypropylene plastic body having a urethane film of about 40 to 90 $\mu$m in thickness thereon was crushed so that the crushed particles whose side is 10 mm or smaller were obtained.

These crushed particles were supplied to a twin-screw extruder (a twin-screw extruder having a liquid supplying holes additionally provided on a cylinder of a twin-screw extruder TEX44 manufactured by The Japan Steel Works Co., Ltd.) in an amount of 15 kg per hour.

An alkali aqueous solution in which the mol concentration of sodium hydroxide is between 0.025 to 0.25 was added into the cylinder from the liquid supplying hole by a pump so that the ratio of the alkali aqueous solution to the crushed particles H was in the range of from 0.5 to 5%.

The twin-screw extruder was driven by setting the temperature of the heater thereof to 100° to 200° C.

Figure 2:
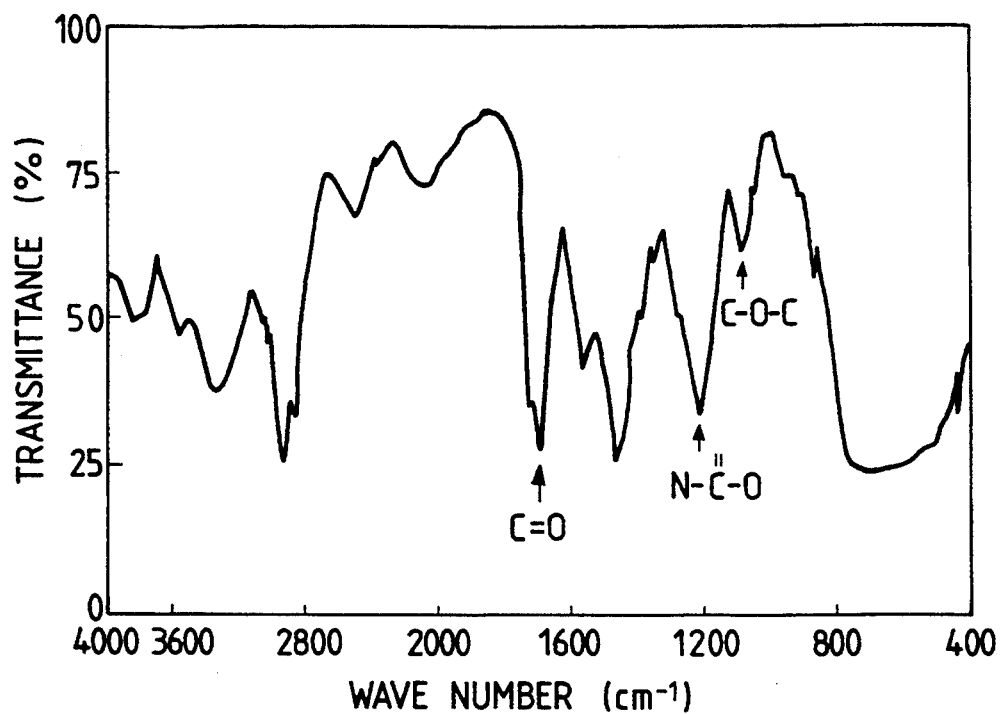
FIG. 2 is an infrared absorption spectrogram of paint film before a film decomposes.
Figure 3:
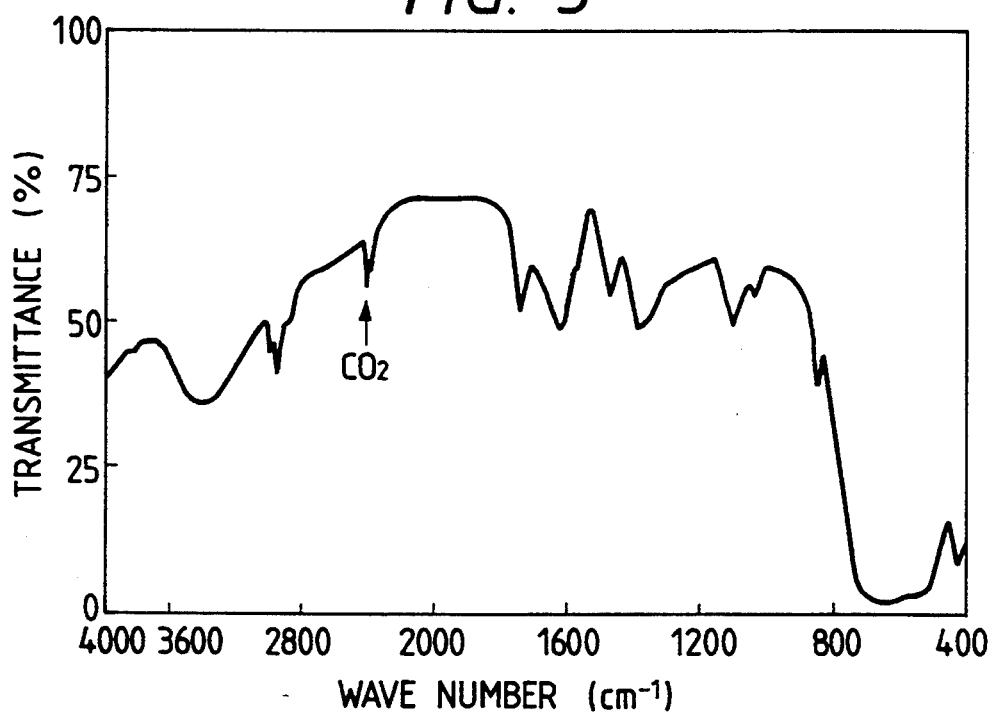
FIG. 3 is an infrared absorption spectrogram of components contained in a decomposed gas recovered from a vent tube.
Figure 4:
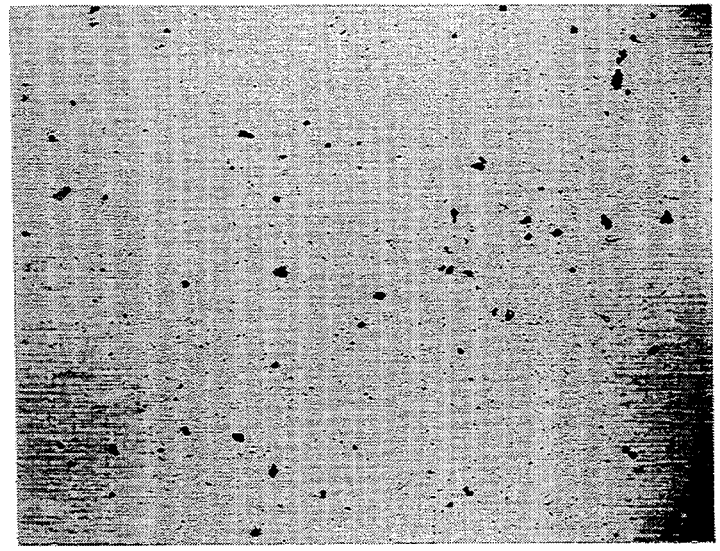
FIG. 4 is a photomicrograph of a plastic body that has adhered to a screw positioned at a point 9 of the vent tube.
Figure 5:
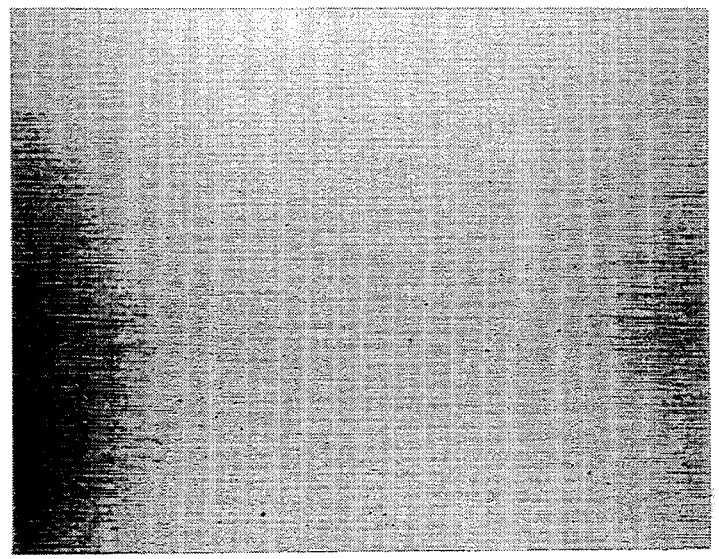
FIG. 5 is a photomicrograph of a plastic body that has adhered to the screw positioned at a point 9' of the vent tube.

Inside the twin-screw extruder, the urethane film pieces were decomposed from the peripheries thereof and were formed into still finer particles by mechanical pulverization. In order to evaluate the degree to which the film pieces were decomposed inside the twin-screw extruder, an analysis was made on a sample obtained by solidifying a decomposed component while entrapping a decomposed gas along the piping for sucking the gas before being discharged from the vent tubes 9, 9' and rapidly cooling such entrapped decomposed gas. As a result, in the film before decomposition (see FIG. 2 for results of the analysis), there was a urethane bond that is a portion crosslinking diisocyanate and polyol which were the main components of the film, but in the components recovered from the vent tube the peak of the urethane bond (for example, 1076 cm$^{-1}$, 1220 cm$^{-1}$ and 1770 cm$^{-1}$) disappeared and a spectral peak attributable to $CO_2$ (for example, 2350 cm$^{-1}$) was observed. Therefore, it was verified from that the film was decomposed into polyol and primary amine or diamine (see FIG. 3 for results of the analysis). It is thus assumed that the organic components in the film were made into small molecules by decomposition and that the thus processed organic components were gasified by heat and discharged from the vent tube together with the gasified alkali aqueous solution. In the case where crushed particles containing the plastic body and the film in a ratio of about 2% by weight of the former to the latter were supplied in an amount of 15 kg per hour to the extruder, the decomposed components collected from the vent tube 9 weighed about 1.5 g per minute and from the vent tube 9', about 1.2 g per minute. It was verified that the total weight of the collected substance accounted for about ½ the weight of the film. While the collected substance was a solid formed by the above-described method, the temperature of the gas flowing through the tubes subsequent to the collecting points was 100° C. or more, and the decomposed components contained in the gas discharged from the extruder could not be solidified 100%. Hence, it is assumed that the weight of the decomposed components actually discharged was more than the above figure. It is conceivable that the decomposed film can be further removed from the plastic product by repeating the process of supplying and discharging the alkali aqueous solution in this way. In order to verify that the film was actually being removed from the plastic product, the rotation of the screw of the extruder was stopped; the plastic having adhered to the screw in the vicinitly of the vent tubes 9 and 9′ were taken out using the vent holes; the plastic was formed into a film by a heatable press at 200° C. and cooled; and such plastic film was observed by an optical microscope at a magnification of 20×. As a result, while the crushed particles before being supplied to the extruder had film pieces 10 to 5 mm square, the film pieces in the plastic (FIG. 4) collected from the screw in the vicinity of the vent tube 9 were such that the side thereof was about 50 $\mu$m or less. Further, it was verified that the film pieces in the plastic (FIG. 5) collected from the screw in the vicinity of the vent tube 9′ were such that the side thereof was about 20 $\mu$m or less. Judging from this result and the above-described weight of the decomposed film in the decomposed gas collected from the vent tubes, it can be assumed that the film was made finer as well as into a decomposed gas by decomposition and pulverization and removed from the plastic together with the gasified alkali aqueous solution as discharged.

Further, the following experiment was conducted separately in order to verify the decomposability of the urethane film. A film and an alkali aqueous solution were charged into an autoclave and mixed at a high temperature. Since the inside of the autoclave was heated, the pressure increased as well. As a result, the film in the form of film disappeared completely. From an analysis made on the residue in the autoclave it was found that only a residue in the form of fine powder from which the urethane bond in the film disappeared (similar to the result of the analysis of FIG. 2) and inorganic substances contained in the film were obtained. This has led the inventors to assume that the film was thermally decomposed and hydrolyzed. It is therefore hypothesized that a similar reaction or behavior will take place in the twin-screw extruder and bring about the following. Heat from the heater and heat from shearing, friction and the like caused by the rotation of the screw fuse and knead the polypropylene plastic body. Such fusion pulverizes the urethane film. The pulverized urethane film pieces are not only kneaded and pulverized with the alkali aqueous solution under high temperature and pressure, but also gasified through decomposition from the outer peripheries thereof to become still finer film pieces. Vapor derived from the decomposed gas and the gasified alkali aqueous solution is discharged from the vent tubes. Pulverization and decomposition of the film can be promoted by repeating this operation.

Accordingly, the film was not only made into fine pieces by mechanical crushing on the one hand, but also pulverized, decomposed and removed by chemical gasification the other. The film pieces left undecomposed and the undecomposable inorganic substances were uniformly dispersed in the plastic in sizes of 10 $\mu$m or less by the screws of the twin-screw extruder and the plastic in which the finer film pieces are dispersed is extruded by the dies of the extruder.

The extruded plastic was pelletized and dried to obtain reclaimed plastic.

From an analysis made on the reclaimed plastic obtained in Example 1 it was found that about 80% of the film was removed and the ratio of the urethane film contained in the reclaimed polypropylene plastic was 0.5% or less.

The reclaimed plastic was formed in a plate-like shape and observed. It is judged from the observation that high-quality plastic containing no residual film was reclaimed. The impact strength of the plastic obtained by reclaiming the bumper of the automobile without removing the urethane film was 50 to 60% with the impact strength of the polypropylene plastic being 100%, whereas the impact strength of the reclaimed product obtained in Example 1 was about 90%.

EXAMPLE 2

Experiments were conducted to the effect of added water, verify the effect of pretreatment, and the influence of cylinder heating temperature.

When an experiment was conducted by adding water instead of the alkali aqueous solution, substantially the same result was obtained. The reason is assumed to be that the added water behaves in the same manner as the moisture of the alkali aqueous solution. That is, when water was added, moisture vaporized from the fused plastic. At the time of vaporization, the heat of the plastic inside the twin-screw extruder was removed as latent heat of vaporization to cool the plastic. As a result, the viscosity of the fused plastic increased and the shearing and frictional force, etc. caused by the rotation of the screws increased to promote not only pulverization of the urethane film and gasification thereof by decomposition.

The crushed particles were immersed into an ethanol solution before being supplied to the twin-screw extruder and tested as described above with the exception of using a water instead of the alkali aqueous solution. With respect to the separation and decomposition of the urethane film, substantially the same results were obtained as in the case of removing the urethane film as a decomposed gas while supplying the alkali aqueous solution to the extruder and decomposing, pulverizing and discharging the urethane film. The effect for separation and decomposition maximized when the crushed particles were supplied to the twin exculder immediately or within 1 to 2 hours after taken out from ethanol solution. The effect impaired after 1 day or more from the time the crushed particles were taken out.

The melting point of the plastic was found to be 163° to 164° C. as a result of a differential thermal analysis. The reclaimed plastic was obtained by setting the heating temperature of the heater of the twin-screw extruder to about the above-described melting point or lower to 100°–170° C. The surface of the reclaimed plastic was good. The reason is assumed to be that lower temperatures contribute to increasing kneading resistance by the screws and that such an increase in kneading resistance encourages pulverization of the urethane film and gasification thereof by decomposition.

As described in the foregoing pages, the invention is characterized as providing high-quality reclaimed plastic inexpensively by obtaining crushed particles while crushing a plastic product having a film into pieces of a predetermined size, supplying the crushed particles to a screw-type extruder for kneading and fusing, separating the film from the plastic body, pulverizing and decomposing the film pieces while supplying water to the extruder, and discharging the resultant gases.

That is, the crushed particles are supplied to the screw-type extruder to be kneaded and fused. Since kneading and fusing is accompanied by the supplying of water to the extruder, the film gets separated from the plastic body and pulverized to finer pieces during this process. The film pulverized into finer pieces is then decomposed and gasified from the periphery thereof, and removed. This contributes to decreasing the absolute content of the film in the reclaimed plastic. The film pieces and the inorganic substances left undecomposed are dispersed uniformly in the form of fine powder. As a result, the quality of the reclaimed product extruded from the screw-type extruder is high; the appearance thereof not poor; and the strength thereof sufficient. Hence, a wide range of applications for the reclaimed product can be ensured.

Further, the process of obtaining crushed particles by crushing a plastic product having a film to pieces of a predetermined size is economical because such process can be performed by a known crusher. The use of the extruder in separating the film from the plastic body, decomposing the separated film, and discharging the decomposed gas of the film makes continuous reclaiming possible and efficient. Still further, since a solvent is not used, a process free from environmental problems can be achieved.

According to the invention involving the addition of an alkali aqueous solution or according to the invention involving the immersion into or contact with an ethanol solution in the pretreatment, the decomposition and removal of the film is further encouraged in addition to the above-described effects, thereby allowing high-quality reclaimed plastic to be obtained.

What is claimed is:

1. A method of reclaiming a plastic product having a paint film, comprising the steps of:
    obtaining crushed particles by crushing a plastic product having a paint film into particles of a predetermined size;
    supplying the crushed particles to a screw extruder;
    kneading and fusing the crushed particles while supplying water thereto such that the paint film is separated from the plastic body, decomposed and gasified into decomposed gas; and
    obtaining a plastic by discharging said decomposed gas.

2. A method of reclaiming a plastic product having a paint film as claimed in claim 1, wherein the steps of kneading the crushed particles while supplying water thereto and discharging the decomposed gas produced by decomposing the paint film and vaporized water are repeated twice or more inside the screw extruder.

3. A method of reclaiming a plastic product having a paint film as claimed in claim 1,
    wherein said step of discharging the decomposed gas is performed using forced suction.

4. A method of reclaiming a plastic product having a paint film as claimed in claim 1, wherein the water supplied to the screw extruder is an alkali aqueous solution.

5. A method of reclaiming a plastic product having a paint film as claimed in claim 1, further comprising the steps of:
    immersing the crushed particles into or bringing the crushed particles into contact with an ethanol solution; and
    supplying the thus treated crushed particles to the screw extruder thereafter.

6. A method of reclaiming a plastic product having a paint film as claimed in claim 1, wherein the crushed particles are obtained by crushing a bumper of an automobile, the bumper being made of a thermoplastic resin and having a paint film.

* * * * *

Adverse Decisions In Interference

Patent No. 5,443,772, Shigeki Inoue, Fumiaki Tsuda, Mitsuo Nagai, Tadamoto Sakai, Kazuyuki Nakamura, METHOD OF RECLAIMING PLASTIC PRODUCT WITH PAINT FILM, Interference No. 104,362, final judgment adverse to the patentees rendered September 6, 2000, as to claims 1-6.
*(Official Gazette October 17, 2000)*